July 12, 1960     M. D. POE     2,944,363
FISHING LURE
Filed Sept. 13, 1957
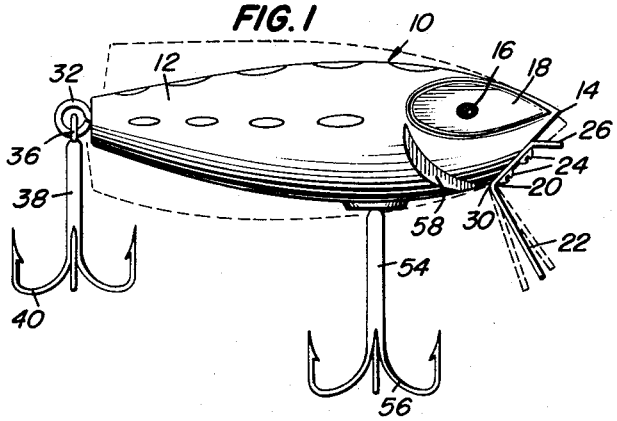
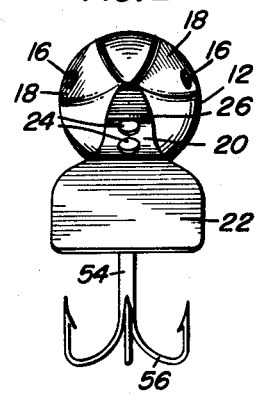
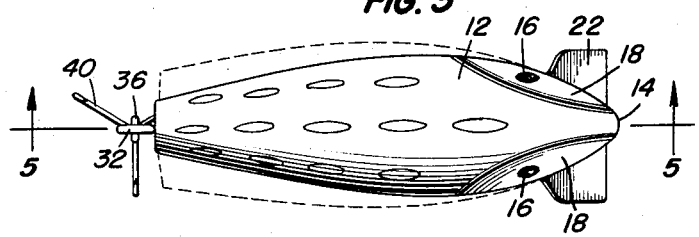
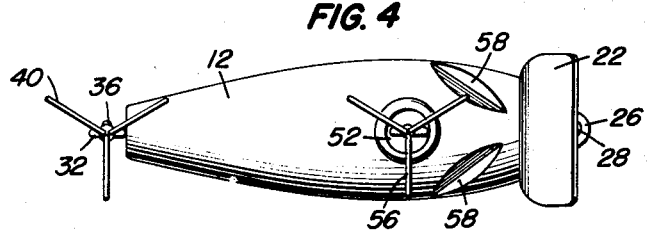
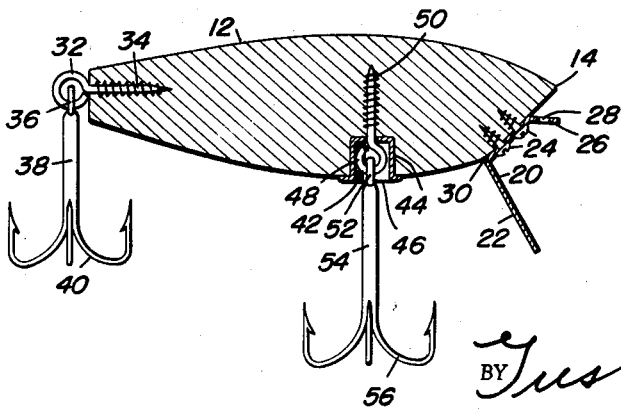
INVENTOR
Milton D. Poe
BY
ATTORNEY

2,944,363

FISHING LURE

Milton D. Poe, 1949 River Road, Modesto, Calif.

Filed Sept. 13, 1957, Ser. No. 683,825

1 Claim. (Cl. 43—42.22)

This invention relates to a fish lure, and it particularly relates to a fish lure of the type having multiple hooks and which simulate the appearance of actual bait.

Although a great many different types of fish lures have been made prior to this, none of them was capable of being used equally as well in deep water or on the surface while maintaining a simulated live wriggling or twitching in either position.

It is, therefore, one object of the present invention to provide a fish lure which by a simple adjustment will automatically be adjusted to move through the water on the surface or below the surface of the water.

Another object of the present invention is to provide a fish lure which will simulate bodily movement equally as well both at and below the surface of the water.

Another object of the present invention is to provide a fish lure which is easy to handle, simple to manipulate and not easily broken.

Other objects of the present invention are to provide an improved fish lure, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a side elevational view of a fish lure embodying the present invention.

Fig. 2 is a front end elevational view of the device of Fig. 1.

Fig. 3 is a top plan view of the device of Fig. 1.

Fig. 4 is a bottom plan view of the device of Fig. 1.

Fig. 5 is a sectional view taken on line 5—5 of Fig. 3.

Referring now in greater detail to the drawing wherein similar reference characters refer to similar parts, there is shown a fish lure, generally designated 10, which comprises a plug body 12 having the general shape of a minnow. The front or nose portion of the plug body tapers towards the forward end and is substantially pointed, as at 14. The nose portion is further formed with a flattened downwardly and rearwardly inclined underside. At the upper side of the front portion are a pair of simulated eyes 16, one on each side of the body to simulate the eyes of the fish, while surrounding the eyes 16 on the front portion are provided a pair of concavely beveled surfaces 18 relatively flattened toward the front, one on each side of the body. The beveled surfaces 18 simulate the cheeks of the fish and will be referred to as cheek bevels.

Connected to the flattened bottom side of the front or nose portion of the plug body 12, between the two cheek bevels 18, is the attaching flange 20 of a baffle plate 22. The flange 20 is integral with the plate 22 but is tapered to fit the inclined surface of the underside of the nose so as to lie between the bevel cheeks 18. The flange 20 is provided with a pair of holes to receive the screws 24 for connecting the baffle plate to the plug body. At its upper end, the flange 20 is provided with an offset lip 26 which extends away from the plug body. This lip 26 has a hole 28 to which the line is adapted to be attached. The baffle plate 22 and flange 20 are constructed of sheet metal or the like so that the baffle plate can be adjusted from one angular position to another by bending along the line 30 formed between the baffle plate 22 and its flange 20.

At its rear end, the plug body 12 is truncated and in this truncated end is screwed an eyelet 32 having a screw portion 34. An eyelet 36 is loosely connected to the eyelet 32 and this eyelet 36 is integral with the stem 38 of a rear hook 40.

On the bottom of the plug body 12, intermediate the front and rear, is provided a recess 42 defined by a lining portion 44. The lining portion 44 has a rim 46 around its open lower end; this rim being crimped over the edges of the recess to hold the lining portion in place. An eyelet 48 is positioned within the recess 42 and is held in place by its screw portion 50. Another eyelet 52 is loosely connected to eyelet 48 and from this eyelet 52 depends a stem 54 of a hook 56.

On the underside of the plug body, adjacent the front portion may be provided a simulated pair of gills 58 to heighten the simulated effect of the lure. These gills may be painted, engraved or even cut out as recesses. However, it is preferred that the gills 58 either be painted on or entirely eliminated since any recesses would interfere with the desired action of the lure in the water.

In operation, the lure is given a twitching or wriggling motion in the water by means of the cheek bevels 18 and baffle plate 22. The water impinging against the baffle plate 22 creates a vortex which causes a tendency of the front end of the lure to sink to lower levels. The water is then directed against the cheek bevels 18. The impingement of the water against the cheek bevels exerts an opposite effect upon the lure whereby its front end is urged upwardly. These two opposite actions do not cancel each other out since the water which is first scooped up by the baffle plate 22 exerts a greater pressure thereon than the water which strikes the cheek bevels. This is due to the fact that after the water is scooped up by the baffle plate 22 it is then directed against the cheek bevels at a relatively slight angle. The stabilizing effect of the cheek bevels, however, is sufficient to cause the rear portion of the lure to wriggle as the result of the pressure differentials.

By bending the baffle plate 22 backwards along the junction line 30, the lure is set for deeper running in the water, whereas, by bending the plate 22 forward, the lure can be made to swim on the surface of the water, creating a small wake.

The action of the lure can also be controlled by varying the position at which the baffle plate 22 is attached to the lure. If attached higher, the wriggling action will be less, whereas if attached lower, the wriggling action will be increased. If attached sufficiently low, the entire lure, rather than just its rear portion, will be caused to wriggle.

In addition to the above, the reflection of light from the sheet metal baffle plate 22 against the cheek bevels 18, causes a reflection of beams of light in various directions through the water. These beams of light aid in attracting the fish in the water.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A fish lure comprising a generally streamlined body having a convex top and bottom, a forwardly-convergent tapered nose having a flattened downwardly and rearwardly inclined underside and a truncated tail, hook means, means securing said hook means to said body, a tapered attaching plate conforming to the inclined underside of said nose and secured thereto, a flat straight edged baffle plate bendably secured to the lower rear edge of said attaching plate and underlying the lowermost portion of said body, said baffle plate extending laterally beyond the sides of said body and therebelow and being adapted to be readily and manually bent to a selected position of angular adjustment relative to the longitudinal axis of said body, an offset apertured lip bendably secured at the top of said attaching plate, said apertured lip being adapted to be readily and manually bent to a selected position of angular adjustment relative to the longitudinal axis of said body, said apertured lip being adapted for attachment to a fishing line and oppositely disposed concaved cheek bevels in the upper front side of said body having flattened forward end portions adapted to be impinged by a water vortex created by said baffle plate to impart a wriggling motion to the lure.

References Cited in the file of this patent
UNITED STATES PATENTS

| | | |
|---|---|---|
| 1,615,803 | Pflueger | Jan. 25, 1927 |
| 1,836,651 | Davenport | Dec. 15, 1931 |
| 1,872,406 | Chapleau | Aug. 16, 1932 |
| 2,011,075 | Pflueger | Aug. 13, 1935 |
| 2,158,037 | Pflueger | May 9, 1939 |
| 2,494,384 | Gadzinski et al. | Jan. 10, 1950 |
| 2,556,205 | McRoberts | June 12, 1951 |